US008402654B2

(12) United States Patent
Nakamoto

(10) Patent No.: US 8,402,654 B2
(45) Date of Patent: Mar. 26, 2013

(54) METHOD FOR CUTTING OFF NOZZLE PLATE AND METHOD FOR MANUFACTURING NOZZLE PLATE

(75) Inventor: Hikaru Nakamoto, Inuyama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 824 days.

(21) Appl. No.: 11/966,027

(22) Filed: Dec. 28, 2007

(65) Prior Publication Data

US 2008/0155825 A1 Jul. 3, 2008

(30) Foreign Application Priority Data

Dec. 28, 2006 (JP) ................................ 2006-354323
Oct. 11, 2007 (JP) ................................ 2007-265774

(51) Int. Cl.
*B41J 2/16* (2006.01)
*B23P 17/04* (2006.01)

(52) U.S. Cl. .............. 29/890.1; 29/412; 29/417; 347/44

(58) Field of Classification Search ................. 29/890.1, 29/412, 417; 72/372; 428/64.1; 347/44; 264/153, 643
See application file for complete search history.

(56) References Cited

U.S. PATENT DOCUMENTS 3,074,143 A * 1/1963 Smith ...................... 264/643 X
3,267,623 A * 8/1966 Block ...................... 428/64.1 X
6,183,064 B1 * 2/2001 Murthy et al. ........... 29/890.1 X
6,213,588 B1 * 4/2001 Silverbrook ................ 347/44 X
2004/0263565 A1 12/2004 Kobayashi et al.
2005/0040581 A1 2/2005 Ito

FOREIGN PATENT DOCUMENTS

JP 55042879 A * 3/1980 .................... 264/153
JP 58051162 A * 3/1983 ............... 29/890.1 X
JP H06-191043 A 7/1994
JP 2000-246363 A 9/2000
JP 2005-040990 A 2/2005
JP 2005028641 A 2/2005

OTHER PUBLICATIONS

Machine Language Translation of Japanese Patent Publication JP 6-191043.*
European Patent Office; European Search Report in corresponding European Application No. 07025126, mailed Mar. 20, 2009.
Japan Patent Office, Notification of Reasons for Refusal for Japanese Patent Application No. 2007-265774, dispatched Dec. 6, 2011.

* cited by examiner

*Primary Examiner* — A. Dexter Tugbang
(74) *Attorney, Agent, or Firm* — Baker Botts L.L.P.

(57) ABSTRACT

A nozzle plate cutting off method for cutting off the nozzle plate from a primary processing plate including a frame body, a nozzle plate which has multiple nozzle holes for ejecting droplets and is separately arranged inside the frame body, and a connection portion arranged at a clearance between the frame body and the nozzle plate to connect the frame body to the nozzle plate. In the nozzle plate cutting off method, a punching tool is used to punch out the nozzle plate at a connection region of the connection portion with the nozzle plate, there by cutting off the nozzle plate from the primary processing plate.

16 Claims, 10 Drawing Sheets

METHOD FOR CUTTING OFF NOZZLE PLATE AND METHOD FOR MANUFACTURING NOZZLE PLATE

CROSS REFERENCE TO RELATED APPLICATION

The present application claims priorities from Japanese Patent Application No. 2006-354323, which was filed on Dec. 28, 2006, and Japanese Patent Application No. 2007-265774, which was filed on Oct. 11, 2007, the disclosures of which are herein incorporated by reference in its entirety.

TECHNICAL FIELD

The present invention relates to a method for cutting off a nozzle plate formed with multiple nozzle holes for ejecting droplets and a method for manufacturing the nozzle plate.

BACKGROUND

Ink jet printers by which ink droplets are ejected from a nozzle onto a recording medium such as printing paper to form an image are provided with a common ink chamber and an ink-jet head including a plurality of individual ink passages from the common ink chamber to the nozzle. A passage portion of the ink-jet head is constituted by laminating a plurality of plate members formed with holes. One piece of a metal plate is used to form an intermediate plate on which a plate member is retained, and the intermediate plate is then cut off to manufacture the plate member. In forming the intermediate plate, etching process is given to the metal plate, thereby making one or a plurality of plate members retained on a framework. The plate member is retained on the framework by a bridge piece. In cutting out from the intermediate plate, a tool such as a punch is used to cut out the bridge piece, thereby cutting out the plate member from the intermediate plate (Patent Document 1).

[Patent Document 1] Japanese Published Unexamined Patent Application No. 2005-28641 (FIG. 7)

SUMMARY

The nozzle plate cutting off method of the present invention is a nozzle plate cutting off method for cutting off the nozzle plate from a primary processing plate including a frame body, a nozzle plate separately arranged inside the frame body to be formed with multiple nozzle holes for ejecting droplets and a connection portion arranged at a clearance between the frame body and the nozzle plate to connect the frame body to the nozzle plate. A punching tool is used to punch out the nozzle plate at a connection region of the connection portion with the nozzle plate, thereby cutting off the nozzle plate from the primary processing plate.

The nozzle plate manufacturing method of the present invention is a method for manufacturing a nozzle plate formed with multiple nozzle holes for ejecting droplets, and the method has a formation step of forming a primary processing plate including a base portion at least one plate portion separated from the base portion and a first connection portion connecting a base portion to a plate portion, and a first punching step of punching out a first connection region of the plate portion with the first connection portion, and the nozzle plate is manufactured from the plate portion cut out from the primary processing plate by the first punching step.

According to the present invention, a border between a connection portion and a nozzle plate is entirely removed, by which there are found no projections on the side face of the nozzle plate, thus making it possible to prevent a wiper for cleaning an ink ejecting face and printing paper from being caught by the projections.

In the present invention, it is preferable that the punching tool has a circular transverse section. Further, the first punching step is conducted to use a punching tool having the circular cross section, thereby manufacturing the nozzle plate. Incidentally, a counterpart tool which makes a pair of punching tools has a through hole similar in shape to the punching tool. On the assumption that a punching member has a rectangular transverse section, a counterpart tool essentially requires some roundness at the corner due to a manufacturing limitation. Accordingly, there is a lower manufacturing accuracy. However, according to one of the present invention, since the punching tool and the counterpart tool have the same circular transverse section which can be manufactured easily at a higher accuracy, a metal mold for punching out a part of the nozzle plate can be made at a higher accuracy. Thereby, it is possible to make small a flash formed and projected in a punching direction on punching out a part of the nozzle plate.

Further, in one of the present invention, it is preferable that the punching tool has a punching width which is larger than the width of the connection portion, and the punching tool is used to punch out all connection regions corresponding to the connection portions. Still further, in one of the present invention, the first punching step is conducted by using a punching tool having a punching length longer than the length of the first connection region, thereby manufacturing the nozzle plate. It is, therefore, possible to cut out the nozzle plate quickly.

Still further, the formation step may be conducted to form the primary processing plate so as to include a positioning hole for positioning the primary processing plate with respect to the punching tool, to form the primary processing plate in such a manner that the base portion encloses the plate portion, to form the primary processing plate in such a manner that the first connection portion connects the outer circumference of the plate portion to the inner circumference of the base portion at a plurality of places at predetermined intervals, or to form the primary processing plate in such a manner that a plurality of the plate portions are arranged adjacently and the two adjacent plate portions are connected by a second connection portion. Still further, a second punching step may be additionally provided for punching out a second connection region of the plate portion with the second connection portion. In this instance, the second punching step may be conducted to use a punching tool having a punching length longer than the length of the second connection portion existing between the two adjacent plate portions, thereby punching out a second connection region respectively connecting the second connection portion to the two adjacent plate portions. Still further, the formation step may be conducted to form the primary processing plate by etching process.

Further, in the present invention, it is more preferable that the punching tool is allowed to move to a direction at which droplets of the nozzle plate are ejected, thereby punching out the connection region. Still further, in the present invention, the first punching step is conducted to punch out the first connection region by allowing the punching tool to move to the primary processing plate in a direction at which droplets of the nozzle plate manufactured from the plate portion are ejected, thereby manufacturing the nozzle plate. Accordingly, a flash formed and projected in a punching direction on punching out a part of the nozzle plate is found only on an ink ejecting face in the nozzle plate and not found on a face opposite to the ink ejecting face. Therefore, it is possible to attach firmly other members to the face opposite to the ink ejecting face in the nozzle plate and join them at a high accuracy. It is noted that the flash is found on the ink ejecting face but the dimensions are smaller than a submicron. In contrast, a projection formed when a connection portion is cut at some midpoint of the connection portion is from several microns to several tens of microns in dimension. The flash is sufficiently smaller than cut-off residue and will not damage a wiper even if it is brought into contact with the wiper.

Still further, the first punching step is conducted by using a punching tool having a transverse section larger than the flat surface area of the first connection portion existing between the base portion and the plate portion, thereby manufacturing the nozzle plate. The first punching step may be conducted in such a manner that the plate portion is punched out in an area smaller than the punched-out area of the base portion. The second punching step may be conducted in such a manner that the two adjacent plate portions are respectively and substantially equal in the punched-out area. The method of the present invention is a method for manufacturing a nozzle plate formed with multiple nozzle holes for ejecting droplets in which a passage unit leading a liquid to the nozzle holes is attached on one face, the method has a formation step of forming a primary processing plate including a base portion, at least one plate portion separated from the base portion and a first connection portion connecting the base portion to the plate portion, and a first punching step of punching out a first connection region connecting the plate portion to the first connection portion from a specific face of the plate portion, in which the specific face of the plate portion corresponds to one face of the nozzle plate to which the passage unit is attached, and the nozzle plate is manufactured from the plate portion cut out from the primary processing plate by the first punching step.

BRIEF DESCRIPTION OF THE DRAWINGS

Illustrative aspects of the invention will be described in detail with reference to the following figures wherein:

FIG. 10 are plan views of another intermediate plate of the embodiment of the present invention.

DETAILED DESCRIPTION OF THE PREFERRED EMBODIMENTS

Hereinafter, an explanation will be made for preferred embodiments of the present invention with reference to drawings.

Figure 1:
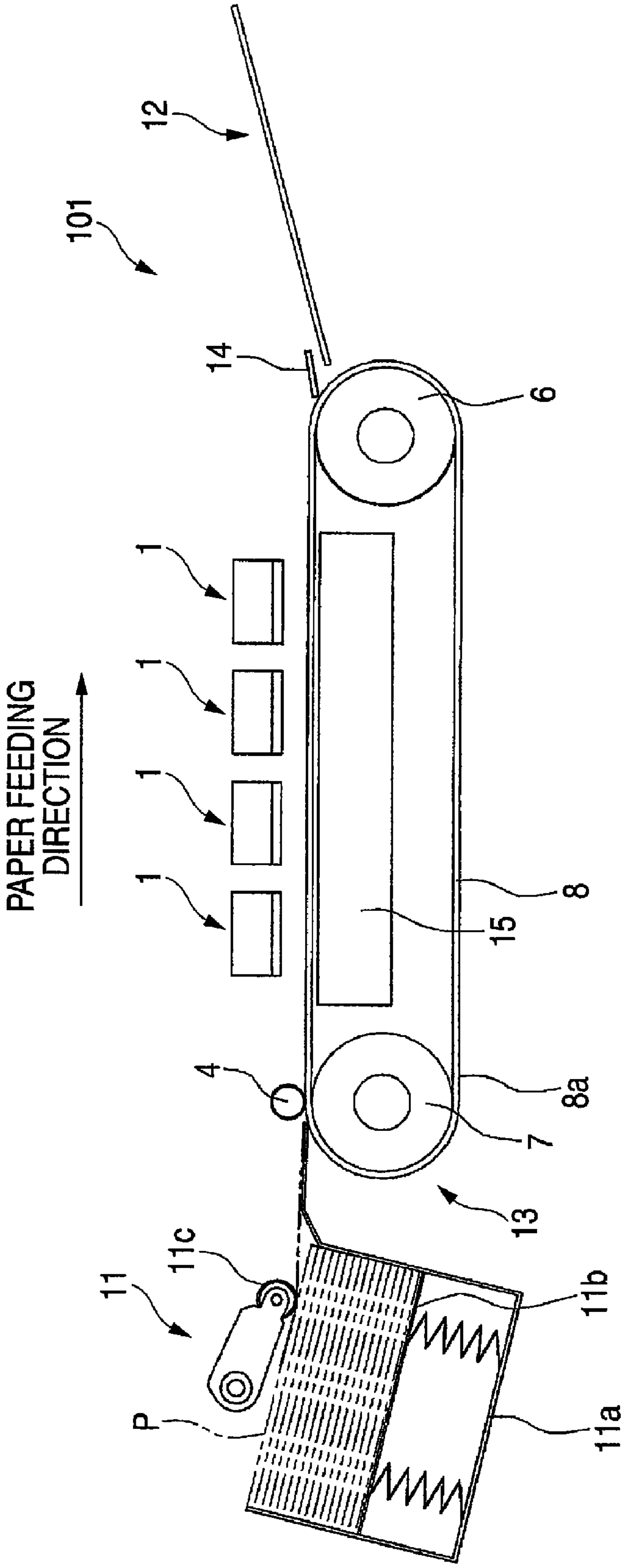
FIG. 1 is a brief side view of the ink-jet printer shown in an embodiment of the present invention.

FIG. 1 is a brief side view showing an overall constitution of an ink-jet printer. As shown in FIG. 1, the ink-jet printer 101 is a color ink-jet printer having tour ink-jet heads 1. The ink-jet printer 101 comprises a sheet feeding portion 11 and a sheet discharging portion 12 respectively on the left and on the right in the drawing.

A paper conveying channel for conveying paper (recording medium) P from a sheet feeding portion 11 to a sheet discharging portion 12 is formed inside the ink-jet printer 101. The sheet feeding portion 11 is provided with a paper stocker 11*a* and a pickup roller 11*c*. The paper stocker 11*a* accommodates multiple sheets of paper P therein. A supporting plate 11*b* urged from the bottom of the paper stocker 11*a* to an opening is arranged inside the paper stocker 11*a*, and multiple sheets of paper P are stacked on the supporting plate 11*b* as well. The pickup roller 11*c* is to pick up the thus stacked paper P one by one from the top and also to send out the thus picked up paper P downstream. The paper P sent out from the paper stocker 11*a* by the pickup roller 11*c* is placed on the outer circumference face 8*a* of a conveying belt 8.

A conveying device 13 is installed at the intermediate portion of the paper conveying channel. The conveying device 13 includes two belt rollers 6, 7, an endless conveying belt 8 rolled around so as to be hung between the rollers 6, 7 and a platen 15 arranged at a position opposing the ink-jet head 1 inside a region enclosed by the conveying belt 8. The platen 15 is to support the conveying belt 8 so that the conveying belt 8 will not move down flexibly in a region opposing the ink-jet head 1. A nip roller 4 is arranged at a position opposing the belt roller 7. The nip roller 4 is to hold down the paper P to the outer circumference face 8*a* in placing the paper P on the outer circumference face 8*a* of the conveying belt 8. The conveying belt 8 has a slightly adhesive layer made of silicone resin on the surface and conveys the paper P to the sheet discharging portion 12, while retaining the paper P adhesively.

A peeling mechanism 14 is installed immediately downstream of the conveying belt 8. The peeling mechanism 14 is constituted in such a manner that paper P adhered on the outer circumference face 8*a* of the conveying belt 8 is peeled from the outer circumference face 8*a* and guided toward the sheet discharging portion 12 shown on the right in the drawing.

Four ink-jet heads 1 are fixed sequentially along a conveying direction of paper P in the order corresponding to four colors of ink (magenta (M), yellow (Y), cyan (C) and black (K)). In other words, the ink-jet printer 101 is a line-type printer. The ink-jet head 1 is a rectangular solid body longer in a direction orthogonal to a conveying direction. Further, the bottom of the ink-jet head 1 serves as an ink ejecting face 2*a* opposing the outer circumference face 8*a* of the conveying belt 8.

When paper P conveyed by the conveying belt 8 passes sequentially immediately downstream of the four ink-jet heads 1, various colors of ink droplets are ejected from an ink ejecting face 2*a* toward the upper face of the paper P, that is, a printing region. Thereby, a desired color image can be formed on the printing region of paper P.

Further, in order to clean the ink ejecting face 2*a*, a wiper mechanism (not illustrated) is arranged in the vicinity of the ink-jet head 1. The wiper mechanism is provided with a wiper, which is a plate member made of an elastic material. The wiper mechanism allows the wiper to move along an extending direction of the ink-jet head 1, while pressing it against the ink ejecting face 2*a*, before start of printing paper P or after completion of the printing. Thereby, extra ink adhered on the surface of the ink ejecting face 2*a* is removed. Still further, meniscus of ink formed inside a nozzle 43 (refer to FIG. 3) opened on the ink ejecting face 2*a* is smoothed.

Figure 2:
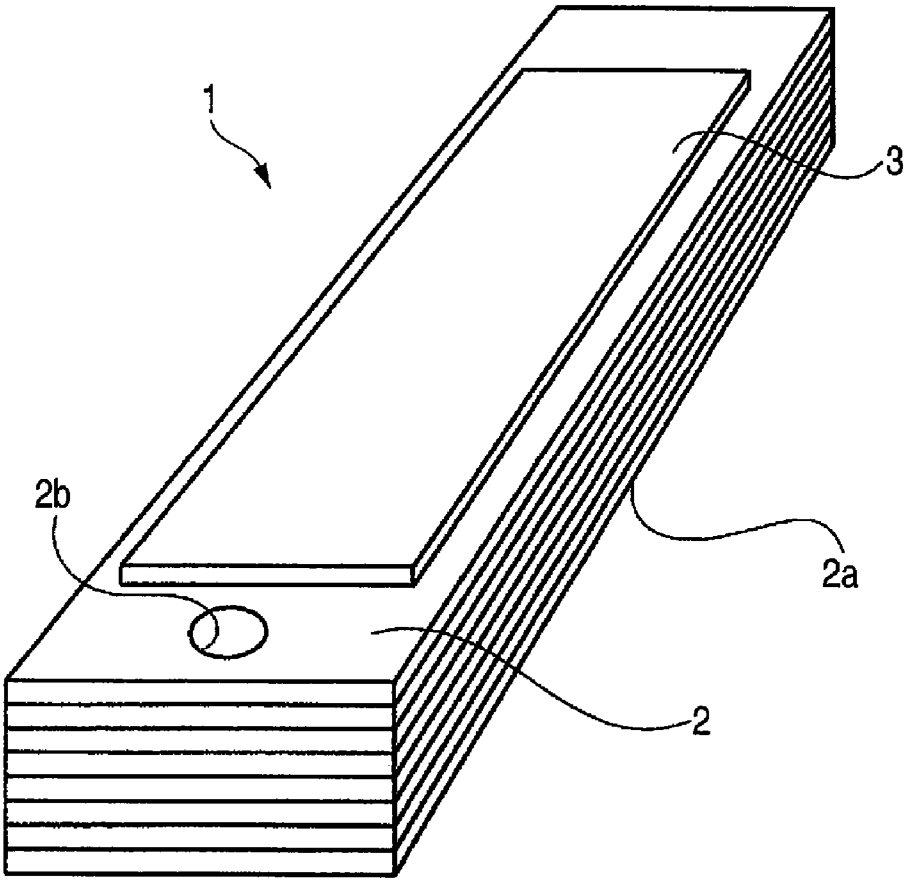
FIG. 2 is a brief perspective view of the ink-jet head given in FIG. 1.
Figure 3:
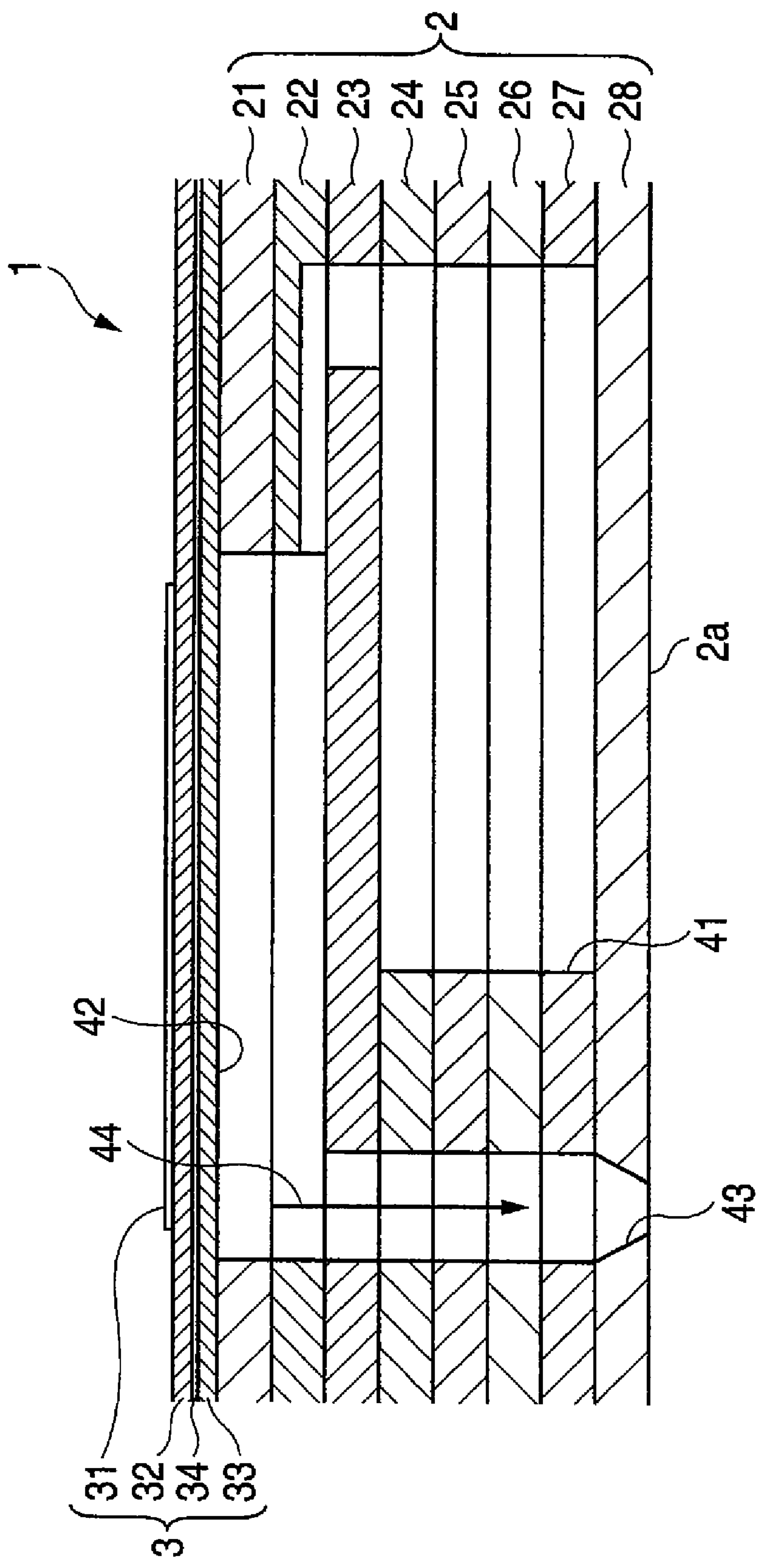
FIG. 3 is an enlarged partial sectional view of the ink-jet head given in FIG. 2.

An explanation will be made for the ink-jet head 1 by referring to FIG. 2 and FIG. 3. FIG. 2 is a brief perspective view of the ink-jet head 1. FIG. 3 is a partially enlarged sectional view of the ink-jet head 1.

As shown in FIG. 2 and FIG. 3, the ink-jet head 1 is provided with a passage unit 2 in a rectangular shape longer in one direction and an actuator unit 3 mounted on the upper face of the passage unit 2. The passage unit 2 is a laminated body structured by laminating sequentially seven sheets of stainless-steel made passage plates 21 to 27 and a nozzle plate 28. An ink supplying port 2*b* for supplying ink externally is formed on the upper face of the passage unit 2 in the vicinity of the longitudinal end. An ink ejecting face 2*a* on which multiple nozzles 43 for ejecting ink droplets are opened is formed on the lower face of the passage unit 2. A common ink chamber 41 into which ink supplied from the ink supplying port 2*b* is allowed to flow and multiple individual ink passages 44 leading from the common ink chamber 41 via a pressure chamber 42 to the nozzle 43 are formed inside the passage unit 2. It is noted that FIG. 3 shows a cross section so that only one individual ink passage 44 is given.

The passage plates 21 to 27 and the nozzle plate 28 are subjected to etching process to make holes. In other words, the holes are made on the passage plates 21 to 27 in such a manner that the common ink chamber 41 and multiple individual ink passages 44 (excluding the nozzle 43) are constituted therein, with these plates being laminated. Further, multiple holes, which are to serve as the nozzles 43, are made on the nozzle plate 28. Each of the pressure chambers 42 is provided with an opening formed on the upper face of the passage unit 2. The opening on each of the pressure chambers 42 is closed by an actuator unit 3 attached on the upper face of the passage unit 2. Ink, which is allowed to flow from the ink supplying port 2*b*, flows into each of the individual ink passages 44 via the common ink chamber 41. Then, the ink, which flows into the individual ink passages 44, arrives at the nozzle 43 via the pressure chamber 42.

The actuator unit 3 is to constitute multiple actuators which impart individually ejection energy to ink inside each of the pressure chambers 42 and, as described above, attached so as to close the openings of multiple pressure chambers 42 on the upper face of the passage unit 2. Then, the actuator unit 3 is structured by sequentially laminating multiple individual electrodes 31 arranged so as to oppose each of the pressure chambers 42, a piezoelectric layer 32, a common electrode 34 and piezoelectric layer 33. The individual electrodes 31 and the common electrode 34 are made of a metal material such as Ag—Pd based metal. The piezoelectric layers 32, 33 are made of a ceramic material based on lead zirconium titanate (PZT) which is strongly dielectric. Further, the piezoelectric layer 32 is held between multiple individual electrodes 31 and the common electrode 34, and the piezoelectric layer 33 is held between the common electrode 34 and the upper face of the passage unit 2. In this instance, when an electric voltage is applied to a space between both electrodes, a part of the piezoelectric layer 32 held between the individual electrode 31 and the common electrode 34 acts as an active layer, and the part is subjected to expansion and contraction in a planar direction. Further, the part which acts as an active layer deforms so as to change the volume of the pressure chamber 42 in collaboration with the piezoelectric layer 33 on the pressure chamber 42. If the active layer is polarized and also electrified in the thickness direction, the active layer is contracted in the planar direction and a part corresponding to the individual electrode 31 is deformed in a convex manner inwardly to the pressure chamber 42. A part corresponding to one individual electrode in a laminated direction acts as one actuator.

As described above, the actuator unit 3 is constituted as a unimorph-type actuator. Each of the actuators is arranged so as to oppose the pressure chamber 42. A predetermined electric voltage pulse is supplied from an actuation driver (not illustrated) to the individual electrode 31, by which the actuator is deformed to change a volume of the opposing pressure chamber 42. As a result, a pressure wave (ejection energy) is given to ink inside the pressure chamber 42, by which ink droplets are ejected from the nozzle 43 communicated with the pressure chamber 42.

Figure 4:
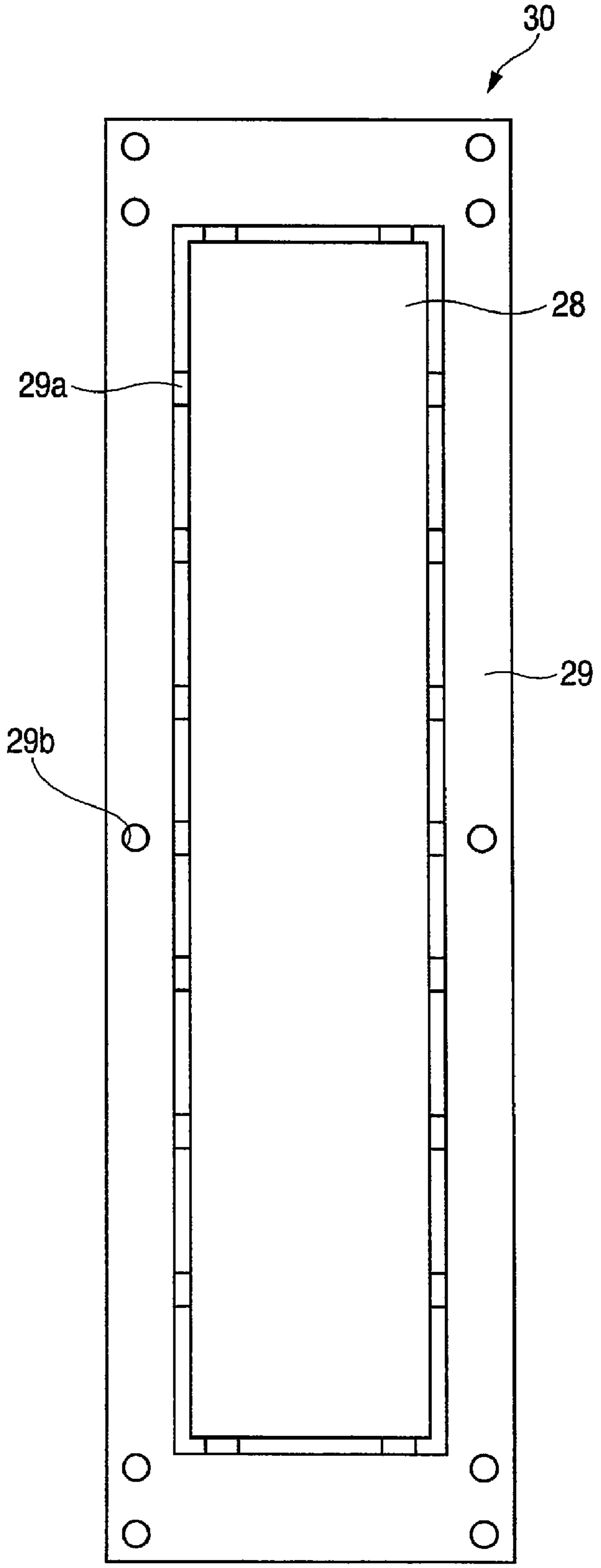
FIG. 4 is a plan view of an intermediate plate including the nozzle plate given in FIG. 2.
Figure 5:
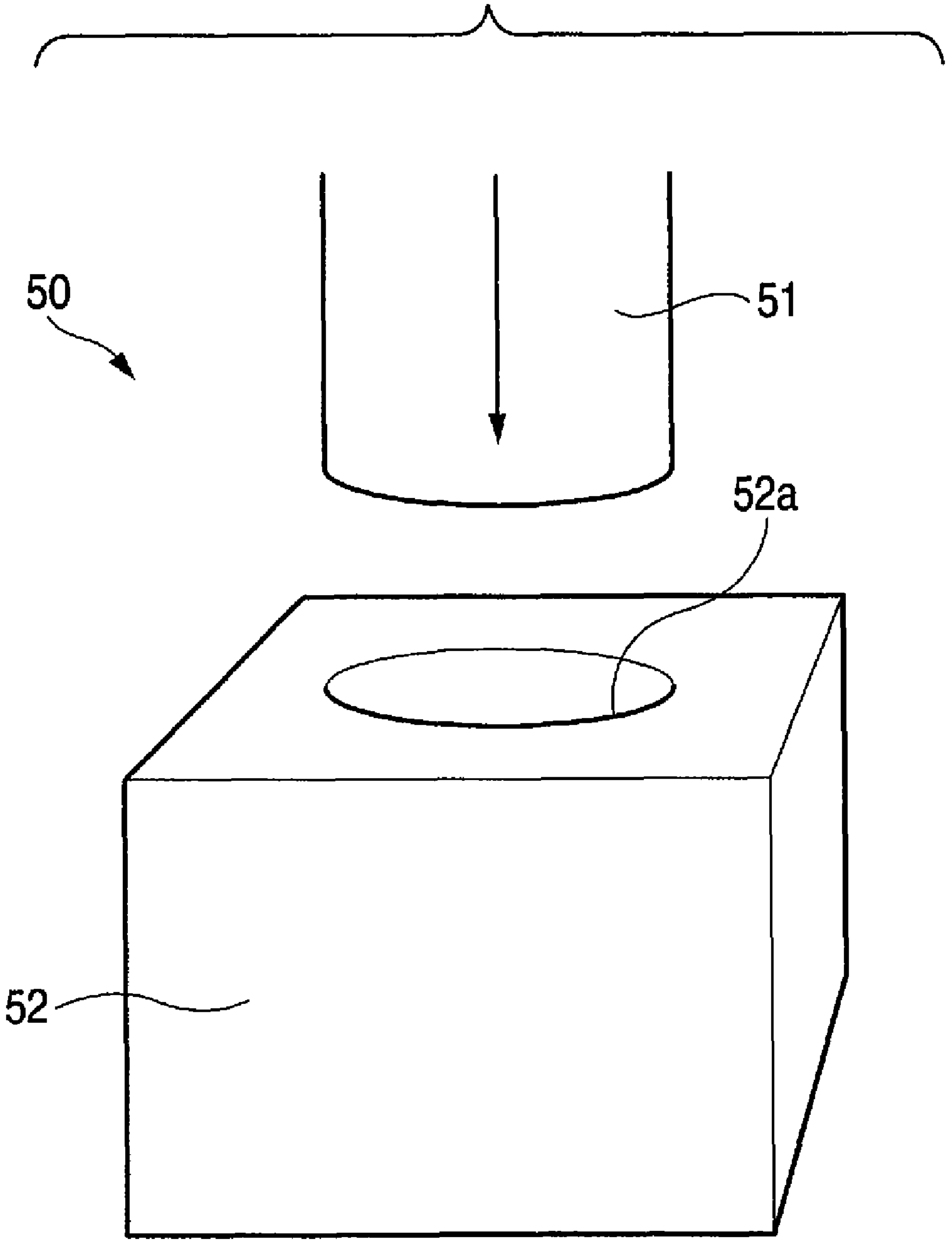
FIG. 5 is an appearance perspective view of a punching tool for cutting off the nozzle plate given in FIG. 2.
Figure 6:
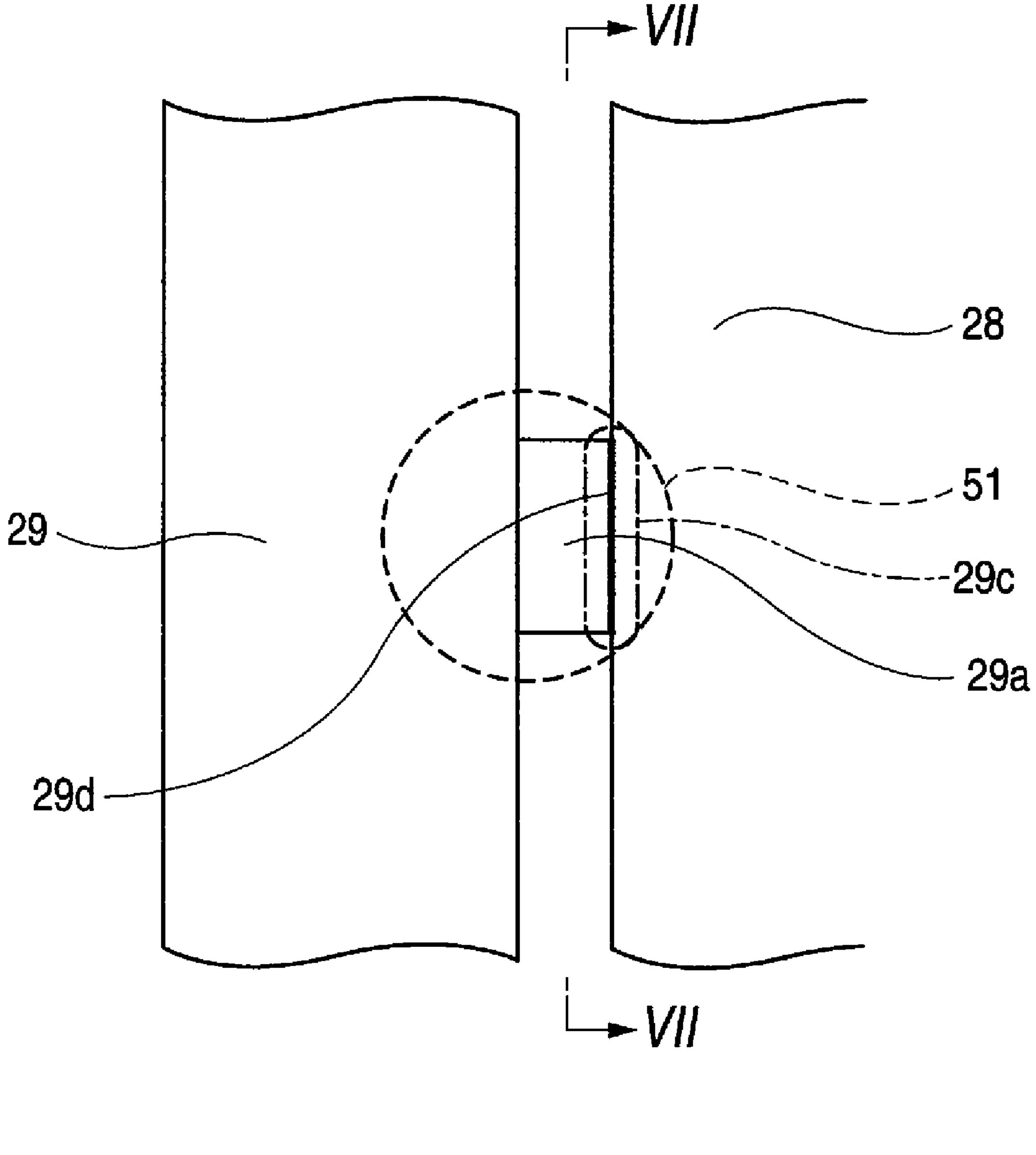
FIG. 6 is an enlarged plan view of a punching tool for cutting off the nozzle plate given in FIG. 2 as viewed from the above.
Figure 7:
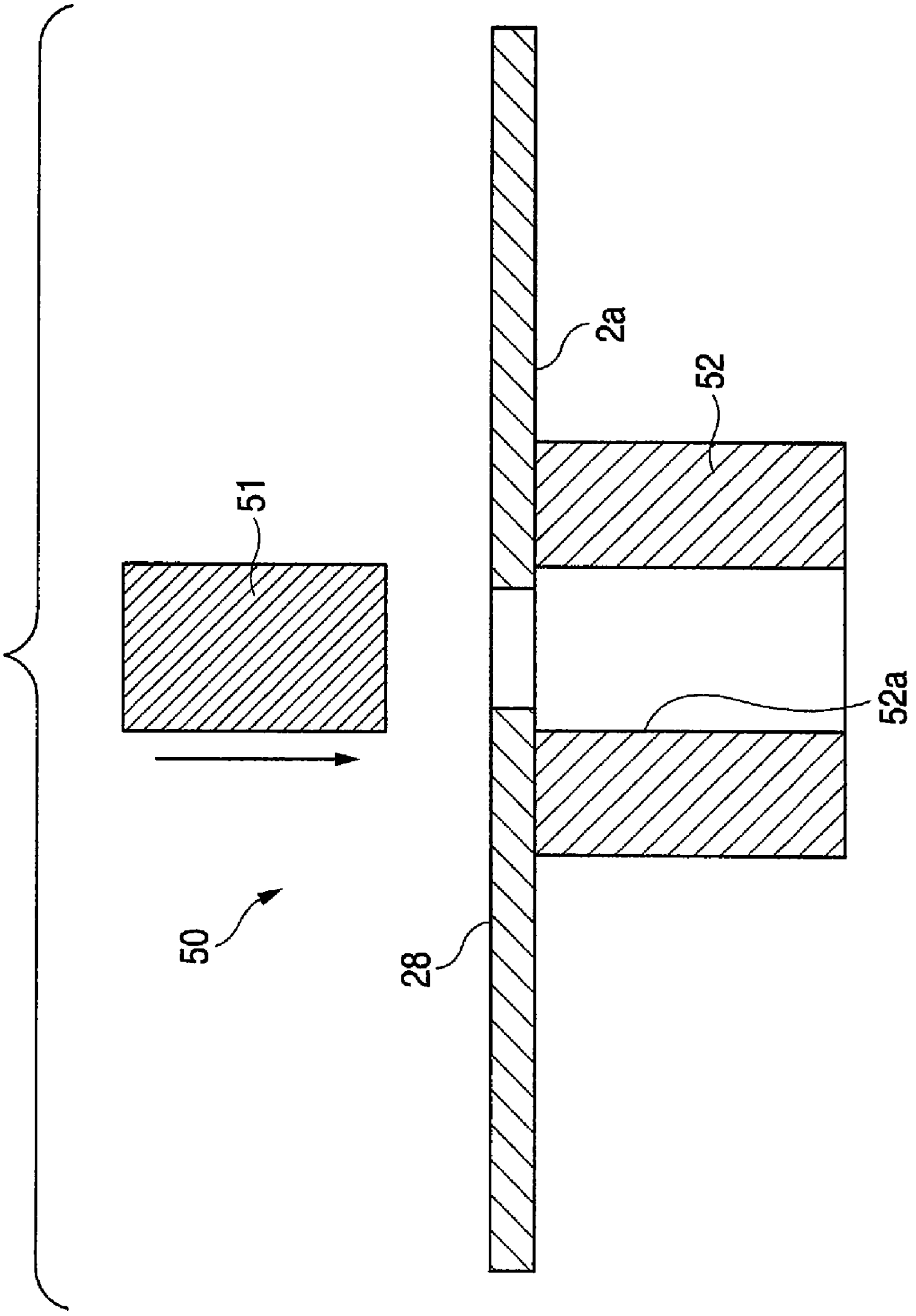
FIG. 7 is a sectional view taken along line of VII to VII given in FIG. 6.
Figure 8:
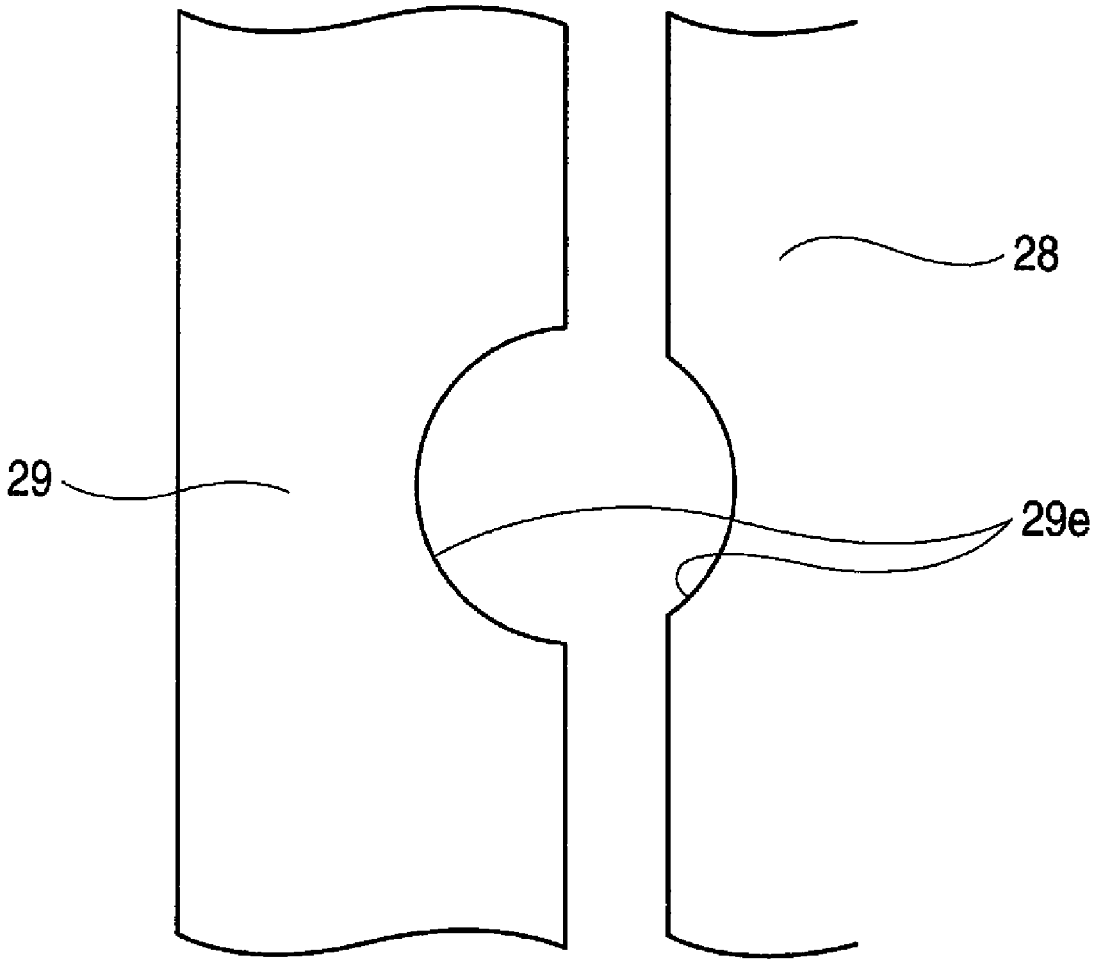
FIG. 8 is an enlarged plan view of a site cut out after the nozzle plate given in FIG. 2 is cut off.

Next, an explanation will be made for a method for cutting off the nozzle plate 28 by referring to FIG. 4 to FIG. 8. FIG. 4 is a plan view showing an intermediate plate (a raw material of the nozzle plate as a primary processing plate made of a metal plate) 30 including the nozzle plate 28. FIG. 5 is an appearance perspective view of a punching tool 50 for cutting off the nozzle plate 28. FIG. 6 is an enlarged plan view of the punching tool 50 for cutting off the nozzle plate 28 when viewed from above. FIG. 7 is a sectional view taken along line VII to VII given in FIG. 6. FIG. 8 is an enlarged plan view of a cutting off site after the nozzle plate 28 is detached.

First, as shown in FIG. 4, one sheet of a metal plate (plate member) is subjected to etching process (boring process), thereby forming an intermediate plate 30. The intermediate plate 30 includes a framework (frame body as a base portion) 29, one sheet of the nozzle plate (plate portion) 28 separately arranged inside the framework 29 from the framework 29 and multiple bridge pieces (connection tabs as the first connection portion) 29*a* arranged at a clearance between the framework 29 and the nozzle plate 28 to connect the framework 29 to the nozzle plate 28. It is noted that the nozzle plate 28 may not have a nozzle hole for ejecting ink at this stage.

The nozzle plate 28 is a rectangular thin metal plate extended in one direction. The framework 29 is a rectangular frame body extended in one direction and used in handling the nozzle plate 28 during the manufacturing steps. Further, two holes each in the vicinity of four corners along the longitudinal direction and one hole each in the vicinity of both ends in the transverse direction at the center of the longitudinal direction, totaling of ten positioning holes 29*b* are made on the framework 29. The positioning hole 29*b* is used in machining the nozzle plate 28. The bridge piece 29*a* is a connection portion for connecting the outer circumference of the nozzle plate 28 to the inner circumference of the framework 29 and two bridge pieces 29*a* are arranged along the transverse direction respectively on both ends in the longitudinal direction of the nozzle plate 28. Further, seven bridge pieces 29*a* are arranged along the longitudinal direction respectively on both ends in the transverse direction of the nozzle plate 28. In the intermediate plate 30 of the present embodiment, a total of 18 bridge pieces 29*a* are formed around the nozzle plate 28. As described above, the intermediate plate 30 is formed, with the nozzle plate 28 retained by the framework 29 via these 18 bridge pieces 29*a*.

Next, a punching tool 50 is used to punch out the bridge piece 29*a*, thereby cutting off the nozzle plate 28 from the intermediate plate 30. As shown in FIG. 5, the punching tool 50 is provided with a punch 51 and a dice 52. The punch 51 is a round punch with a circular transverse section and has a punching width (corresponding to the diameter of the circular cross section of the punch 51, refer to FIG. 6) which is larger than the bridge piece 29*a*. The dice 52 is provided with a bore 52*a* into which the punch 51 enters.

Then, as shown in FIG. 6, the punching tool 50 is used to remove all bridge pieces 29*a* and an entire region of the border between the bridge piece 29*a* and the nozzle plate 28 (the first connection region) 29*c*. In this instance, the punch 51 is used to punch out a part of the nozzle plate 28 in a single punching operation. This punching process is given simultaneously to all bridge pieces 29*a*. It is noted that the border between the bridge piece 29*a* and the nozzle plate 28 means an imaginary line 29*d* overlapping on the outer circumference line of the nozzle plate 28 formed between the bridge piece 29*a* and the nozzle plate 28. Further, the border region 29*c* is a region near a border including the border at the center thereinside, for example, a region enclosed by the single doted and dashed lines given in the drawing. In this instance, as shown in FIG. 7, the punch 51 punches out a part of the nozzle plate 28, while moving from a face opposite to the ink ejecting face 2*a* of the nozzle plate 28 toward the ink ejecting face 2*a*, in other words, in a direction at which ink droplets of the nozzle plate 28 are ejected. Thereby, a very small flash resulting from a difference between the outer diameter of the round punch 51 and the inner diameter of the bore 52*a* on the dice 52 is found only on the ink ejecting face 2*a* and not found on the back face of the nozzle plate 28. Then, as shown in FIG. 8, the punching tool 50 is used to remove partially an edge of the nozzle plate 28 including the above-described border region 29*c* in its entirety. A circular recess 29*e* made by the round punch 51 is formed at the end of the nozzle plate 28 detached from the intermediate plate 30. Therefore, there is no chance that a part of the bridge piece 29*a* remains on the side face of the nozzle plate 28.

In the present embodiment, as shown in FIG. 6, an entire region between the framework 29 and the bridge piece 29*a* is included in a region to which the punch 51 is opposed. The border of the framework 29 is located substantially at the center of the thus opposed region. On the contrary, the border region 29*c* in its entirety is biased to the circumference of the opposing region, with some room left. This is because the border region 29*c* in its entirety is punched out, while a part removed from the nozzle plate 28 is made small. Thereby, the nozzle plate 28 is kept strong. Further, since a circular arc of the recess 29*e* intersects with the outer circumference of the nozzle plate 28 at an obtuse angle, there is no chance that a wiper for wiping the ink ejecting face 2*a* is damaged by the corner of the recess 29*e*. However, it is not essential that in this punching process, the border (border region) of the framework 29 is located at the center of the opposing region. The punch 51 is made relatively small in diameter depending on a slit width between the framework 29 and the nozzle plate 28, and there is a case where a part of the bridge piece 29*a* may remain on the framework 29.

As described above, the cutting off method for manufacturing the nozzle plate 28 is a method for cutting off the nozzle plate 28 from a nozzle plate raw material including a frame body, a nozzle plate 28 separately arranged inside the frame body formed with multiple nozzle holes for ejecting droplets and a connection portion arranged between the frame body and the nozzle plate 28 to connect them, in which a punching tool is used to punch out the nozzle plate without leaving an connection portion at a connection region (border region) of the connection portion to the nozzle plate 28, thereby cutting off the nozzle plate 28, from the nozzle plate raw material. In this instance, it is desirable that a notched portion (recess 29*e*) intersects with the outer circumference of the nozzle plate 28 at an obtuse angle.

The nozzle plate 28 cut out by the above-described method is subjected to metal jointing in a state that it is laminated together with passage plates 21 to 27 and given as a passage unit 2. Further, an actuator unit 3 and control compositions (not illustrated) are assembled to the passage unit 2, thereby completing the assembly of the ink-jet head 1.

According to the present embodiment described above, an entire border region between the bridge piece 29*a* and the nozzle plate 28 is removed, by which there are no projections hanging on bridge pieces 29*a* on the nozzle plate 28, thus making it possible to prevent a wiper for cleaning the ink ejecting face 2*a* and printing paper from being caught by the projections.

Further, since the punch 51 of the punching tool 50 has a circular transverse section, it is possible to make the bore 52*a* on the dice 52 at a higher accuracy. In other words, a difference between the diameter of the punch 51 and that of the dice 52 can be made smallest as compared with a case of a punch with a different configuration. (For example, if a dice having a rectangular through hole is combined with a rectangular punch, some roundness is needed on the corner of the through hole to result in a dimensional difference. The dimensional difference is correlated with the dimensions of a flash.) It is, thereby, possible to make small a flash formed on punching out a part of the nozzle plate 28.

Still further, the punching tool 50 is used to punch out all bridge pieces 29*a* together with a part of the nozzle plate 28 in a single punching operation, thus making it possible to cut out the nozzle plate 28 from the intermediate plate 30 quickly.

In addition, the punch 51 punches out apart of the nozzle plate 28, while moving from a face opposite to the ink ejecting face 2*a* on the nozzle plate 28 to the ink ejecting face 2*a*. Therefore, a very small flash formed on punching is found only on the ink ejecting face 2*a* but not found on the back face of the nozzle plate 28. As a result, it is possible to joint the passage plate 27 at a higher accuracy by firmly connecting the passage plate 27 to the opposite face of the ink ejecting face 2*a* on the nozzle plate 28.

Figure 9:
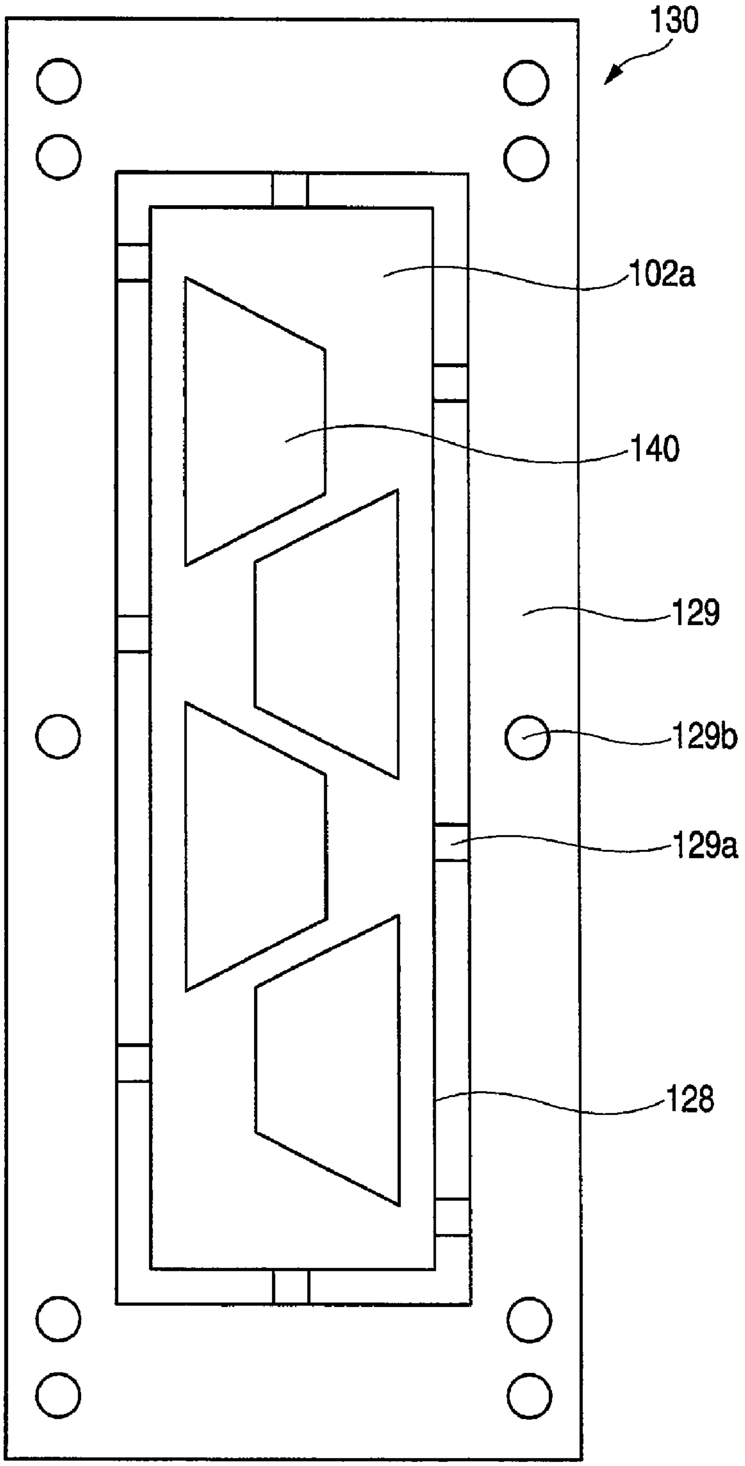
FIG. 9 is a plan view of an intermediate plate including another nozzle plate of the embodiment of the present invention.

Next, an explanation will be made for another nozzle plate by referring to FIG. 9. The cutting off method and the manufacturing method of the present invention are commonly used in preparing the nozzle plate. In the above-described embodiment, 18 bridge pieces 29*a* are arranged at positions opposite to the longitudinal direction and the transverse direction behind the nozzle plate 28. In this embodiment, the bridge pieces 129*a* arranged on both ends of the nozzle plate 128 in the longitudinal direction are arrayed in a cross-stitch manner. In this array, unique effects are obtained in the process of manufacturing the nozzle plate, depending on the arrangement of nozzles.

In the present modified embodiment, a plurality of nozzles are arrayed in a matrix form on the ink ejecting face 102*a* to constitute a nozzle group 140 and arranged in point symmetry at the center of the nozzle plate 128. A plurality of the nozzle groups 140 are installed together in the longitudinal direction of the nozzle plate 28 at a predetermined group interval. Further, a plurality of the nozzle groups 140 are arranged alternately at an equal distance bias in the transverse direction and a mutually opposing direction at the center of the transverse direction of the nozzle plate 128. The bridge pieces 129*a* are disposed corresponding to an arrangement mode of the nozzle groups 140. As shown in FIG. 9, the bridge pieces 129*a* are installed on a side opposite to the side to which the nozzle groups 140 are biased. A plurality of bridge pieces 129*a* are individually arranged at positions which are not opposed to each other on a parallel longer side of the nozzle plate 128.

It is noted that in the present modified embodiment, bridge pieces provided on a short side are arranged at opposing positions behind the nozzle plate 128, as with the above-described embodiment, but may be arranged in a cross-stitch manner. Further, in the present modified embodiment, each of the nozzle groups 140 is formed in a trapezoidal planar shape, and the longer side of the trapezoid is positioned closer to the longer side of the nozzle plate 128 than the short side thereof.

As with the above-described nozzle plate 28, in view of improving and maintaining ink ejection characteristics, there is a case that prior to a cutting off process, a water-repellent film is formed on the ink ejecting faces 2*a*, 102*a*. The intermediate plate 130 of the present modified embodiment is advantageous in forming the water-repellent film.

Electroplating is employed to form a water-repellent film (nickel plating film which contains polytetrafluoroethylene (PTFE), a fluorine-based polymer material). The electric current density on electroplating is set to be about 3 A/dm2 and the temperature of a plating solution is set to be about 50° C., thereby producing a water-repellent film with a thickness of about 2 μm. In this instance, the electric current is supplied from the framework 129 via bridge pieces 128*a* to the nozzle plate 128. In electroplating, the thickness of a water-repellent film is dependent on the current density distributed on the nozzle plate 128. Therefore, there is a tendency that the water-repellent film increases in thickness in the vicinity of the bridge piece 129*a* on which electric current concentrates. However, in the present modified embodiment, the bridge piece 128*a* is separated from the nozzle group 140 for which a uniform thickness is desired, and three bridge pieces 129*a* forming a triangle encloses one trapezoidal nozzle group 140 approximately at an equal distance. Thereby, the electric current is distributed uniformly in each of the nozzle groups 140, and the water-repellent film is made uniform in thickness accordingly.

In the present modified embodiment, after a step of forming the above-described water-repellent film, the punch 51 is used to cut out the nozzle plate 128 from the framework 129. Therefore, in addition to the effects obtained from the above-described embodiment, the water-repellent film is made uniform substantially across the entire nozzle plate 128, thus making it possible to obtain the nozzle plate 128 from which ink can be ejected at a higher accuracy.

Figure 10A:
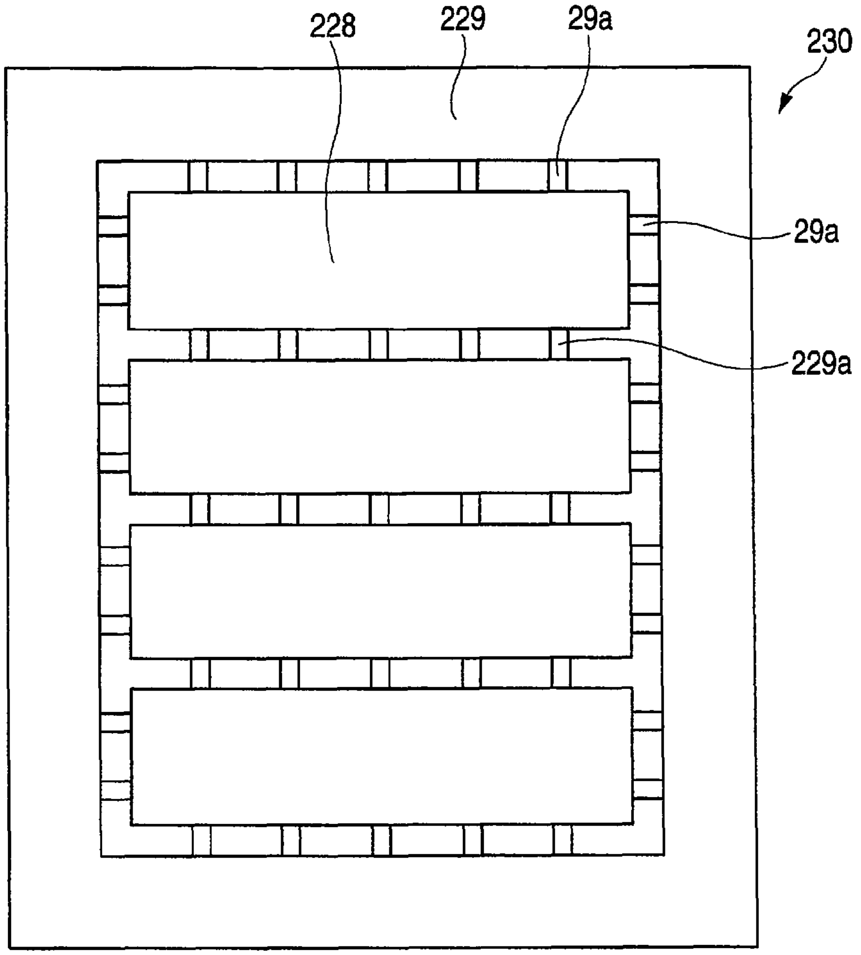
FIG. 10A is a brief plan view showing an entire part of the intermediate plate.

The above-described explanation has been made for preferred embodiments of the present invention. The present invention is not limited to the embodiments described above but may be modified in various ways within a scope of the patent claims. For example, in the above-described embodiment, such a constitution is provided that one sheet of the nozzle plate 28 is retained inside the framework 29 on the intermediate plate 30, but a plurality of the nozzle plates 228 may be retained inside the framework. As shown in FIG. 10A, a plurality of nozzle plates 28 arranged inside the framework 229 extended in one direction so that the longitudinal direction of the nozzle plate 228 comes along the transverse direction of the framework 229 are arrayed along the longitudinal direction a of the framework 229 on the intermediate plate 230. A clearance between each of the nozzle plates 228 and the framework 229 as well as adjacent nozzle plates 228 may be connected by one or a plurality of bridge pieces (second connection portion) 229*a*. In this instance, it is preferable that the bridge piece 229*a* connecting the adjacent nozzle plates 228 is also cut out from the nozzle plate 228 by punching out a part of the nozzle plate 228 so as to remove the border region in its entirety between the bridge piece 229*a* and the nozzle plate 228, as with the bridge piece (first connection portion) 29*a* connecting each of the nozzle plates 28 to the framework 229.

In this instance, in order to punch out the bridge piece 229*a* in a single punching operation, it is necessary to include an entire border region on both ends of the bridge piece 229*a* within a region to which the punch 51 is opposed. If the dimensions and the shape of the bridge piece 229*a* are included within the thus opposed region, the punch 51 may be arranged so that the center thereof can coincide with the center of the bridge piece 229*a*. In this instance, it is preferable that a notched portion by the punch 51 intersects with the outer circumference of the nozzle plate 228 at an obtuse angle. For this reason, adjustment is made for a clearance between adjacent nozzle plates 228, the dimensions of the bridge piece 229*a* and the dimensions of the transverse section of the punch 51. For example, if the punch 51 is set to a certain diameter, the clearance between the adjacent nozzle plates 228 and the width of the bridge piece 229*a* may be set so that punching operation can be conducted in a positional relationship at which the border region is biased to the circumference of the opposed region.

Figure 10B:
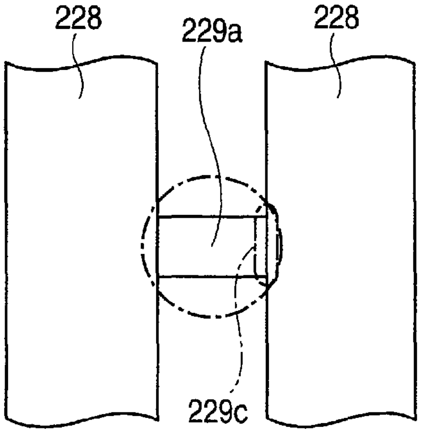
FIG. 10B is a partial plan view showing a positional relationship of a bridge piece connecting adjacent nozzle plates and a punch for punching out the bridge piece.
Figure 10C:
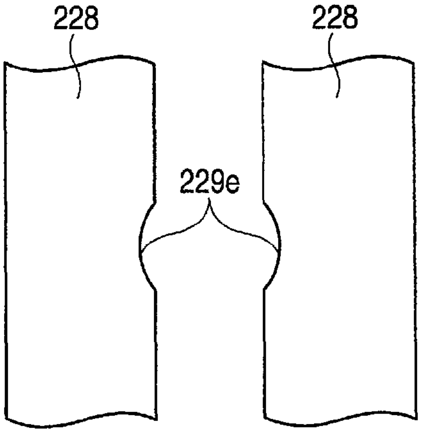
FIG. 10C is a partial plan view showing the outer circumference of nozzle plate which was punched out.

FIG. 10B shows a positional relationship of the bridge piece 229*a* with the punch 51 on punching operation. They substantially coincide at the center. FIG. 10C shows the outer circumference of the nozzle plate 228 after it is punched out. An arc-shaped recess 229*e* is formed on the outer circumference, and the arc intersects with the outer circumference at an obtuse angle respectively in each nozzle plate 228. In this instance, adjacent recesses 229*e*, which are opposed to each other, are substantially similar in shape and dimensions, and almost symmetrical at the punching center. Thereby, for example, a wiper can be effectively and uniformly prevented from being damaged due to the recess 229*e*.

Further, in the above-described embodiment, such a constitution is provided that the punch 51 of the punching tool 50 has a circular transverse section, but it may have another transverse section such as a rectangular shape.

Still further, in the above-described embodiment, both of the frameworks 29, 129, 229 are shaped so as to enclose the entire circumference of nozzle plates 28, 128, 228, but they may not enclose the entire circumference, depending on the dimensions of the nozzle plates 28, 128, 228 with respect to the frameworks 29, 129, 229. For example, such a frame body is acceptable which is devoid of one side among four sides constituting a frame, thereby giving an inverse letter C shape as a whole.

Still further, in the above-described embodiment, such a constitution is provided that the punch 51 has a punching width larger than the bridge piece 29*a*, and the punching tool 50 is used to punch out all bridge pieces 29*a* together with a part of the nozzle plate 28 in a single punching operation. However, a part of the nozzle plate 28 may be punched out by a plurality of punching operations depending on the number of bridge pieces 29*a*. The punch 51 is used to punch out sequentially the bridge pieces 29*a*. In this instance, the punch 51 may have a punching width smaller than the bridge piece 29*a*. In this instance, adjustment is made for a relative position of the punch 51 with the border region 29*c* and a width of the bridge piece 29*a* with respect to the punch 51 so that the nozzle plate can be punched out, with the border region 29*c* biased to the circumference of the opposed region. It is noted that, as with the above modified embodiment, where a plurality of nozzle plates are arranged within one framework, adjacent nozzle plates may be connected to bridge pieces between which another framework is held.

In addition, in the above-described embodiment, such a constitution is provided that the punch 51 punches out a part of the nozzle plate 28, while moving from a face opposite to the ink ejecting face 2*a* of the nozzle plate 28 to the ink ejecting face 2*a*. However, the punch 51 may punch out a part of the nozzle plate 28, while moving from the ink ejecting face 2*a* to a face opposite to the ink ejecting face 2*a* of the nozzle plate 28. In this instance, it is preferable to remove a flash formed on the face opposite to the ink ejecting face 2*a* of the nozzle plate 28.

Further, in the above-described embodiment, such a constitution is provided that after the nozzle plate 28 is cut out from the intermediate plate 30, the passage unit 2 is assembled. However, the passage plates 21 to 27 and the nozzle plate 28 may be laminated and jointed in a state of an intermediate plate, by which the passage unit 2 is formed, and the passage unit 2 is thereafter detached collectively from the thus laminated intermediate plate.

Further, in the above-described embodiment, such a constitution is provided that the punching tool 50 is used to collectively punch out the bridge piece 29*a* and a part of the nozzle plate 28. However, only a part of the nozzle plate 28 is cut from a border between the bridge piece 29*a* and the nozzle plate 28, by which the nozzle plate 28 is cut out from the intermediate plate 30.

In the above-described embodiment, an explanation has been made for a case where the present invention is applied to the nozzle plate 28 of line-type ink-jet head 1 mounted on the ink-jet printer 101. The present invention is also applicable to a nozzle plate mounted on other types of ink-jet heads such as a serial-type ink-jet head. Further, the present invention is applicable to a nozzle plate having nozzles for ejecting droplets other than ink droplets, for example, metal paste droplets.

Further, in the above-described embodiment, the intermediate plate 30 is formed by an etching process but may be formed by other methods or by their combination. A process for obtaining the intermediate plate 30 includes press working, dry etching, sand blast processing and laser processing, in addition to the above-described etching process. For example, a clearance between the framework 29 and the nozzle plate 28 may be formed by etching (formation of the bridge piece 29) and nozzles may be formed by press working. Alternatively, both the nozzles and the clearance may be formed by press working (punching process).

What is claimed is:

1. A method for manufacturing a nozzle plate formed with multiple nozzle holes for ejecting droplets from an original plate, the method comprising:

a formation step of forming a primary processing plate including a base portion, at least one plate portion separated from the base portion with a gap formed therebetween and a first connection portion connecting the base portion to the plate portion by removing a part corresponding to the gap from the original plate; and a first punching step of punching out a first connection region of the plate portion and the first connection portion, such that the plate portion is removed from the base portion, after the formation step, wherein the first connection region of the plate portion is a region of the plate portion adjacent to the first connection portion;

wherein the nozzle plate is manufactured from the plate portion cut out from the primary processing plate by the first punching step.

2. The method for manufacturing a nozzle plate according to claim 1, wherein the first punching step is conducted so that the first connection region can be punched out in a circular shape.

3. The method for manufacturing a nozzle plate according to claim 2, wherein the first punching step is conducted by using a punching tool having a circular cross section.

4. The method for manufacturing a nozzle plate according to claim 1, wherein the first punching step is conducted by using a punching tool, a punching length of the punching tool is longer than a length of the first connection region.

5. The method for manufacturing a nozzle plate according to claim 1, wherein the formation step is conducted to form the primary processing plate so as to include a positioning hole for positioning the primary processing plate with respect to the punching tool.

6. The method for manufacturing a nozzle plate according to claim 1, wherein the formation step is conducted to form the primary processing plate so that the base portion encloses the plate portion.

7. The method for manufacturing a nozzle plate according to claim 6, wherein the formation step is conducted to form the primary processing plate in such a manner that the first connection portion connects an outer circumference of the plate portion to an inner circumference of the base portion at a plurality of places at every predetermined interval.

8. The method for manufacturing a nozzle plate according to claim 1, wherein the formation step is conducted to form the primary processing plate in such a manner that a plurality of the plate portions are placed adjacently to each other and these adjacent plate portions are connected by a second connection portion.

9. The method for manufacturing a nozzle plate according to claim 8, further comprising a second punching step for punching out a second connection region of the plate portion with the second connection portion.

10. The method for manufacturing a nozzle plate according to claim 9, wherein the second punching step is conducted to use a punching tool, a punching length of which is longer than a length of the second connection portion existing between the adjacent plate portions, thereby punching out a second connection region respectively connecting the second connection portion to the adjacent plate portions.

11. The method for manufacturing a nozzle plate according to claim 9, wherein the second punching step is conducted in such a manner that the adjacent plate portions are respectively substantially equal in the punched-out area of the second connection region.

12. The method for manufacturing a nozzle plate according to claim 1, wherein the formation step is conducted to form the primary processing plate by etching process.

13. The method for manufacturing a nozzle plate according to claim 1, wherein the first punching step is conducted to punch out the first connection region by allowing a punching tool to move to the primary processing plate in a direction at which droplets of the nozzle plate manufactured from the plate portion are ejected.

14. The method for manufacturing a nozzle plate according to claim 1, wherein the first punching step is conducted by using a punching tool, a transverse section of which is larger than a flat surface area of the first connection portion existing between the base portion and the plate portion.

15. The method for manufacturing a nozzle plate according to claim 1, wherein the first punching step is conducted in such a manner that the plate portion is punched out in an area smaller than a punched-out area of the base portion.

16. A method for manufacturing a nozzle plate having multiple nozzle holes for ejecting droplets from an original plate, in which a passage unit leading a liquid to the nozzle holes is attached on one face, the method for manufacturing a nozzle plate comprising:

a formation step of forming a primary processing plate including a base portion, at least one plate portion separated from the base portion with a gap therebetween and a first connection portion connecting the base portion to the plate portion by removing a part corresponding to the gap from the original plate; and a first punching step for punching out a first connection region of the plate portion and the first connection portion, such that the plate portion is removed from the base portion after the formation step including a specific face of the plate portion, wherein the first connection region of the plate portion is a region of the plate portion adjacent to the first connection portion, wherein the specific face of the plate portion corresponds to one face of the nozzle plate to which the passage unit is attached, and the nozzle plate is manufactured from the plate portion cutout from the primary processing plate by the first punching step.

* * * * *